UNITED STATES PATENT OFFICE 2,290,416

COMPOSITION OF MATTER AND PROCESS FOR PREVENTING WATER-IN-OIL TYPE EMULSIONS RESULTING FROM ACIDIZATION OF CALCAREOUS OIL - BEARING STRATA

Melvin De Groote, University City, Mo., assignor to Petrolite Corporation, Ltd., Wilmington, Del., a corporation of Delaware No Drawing. Application September 8, 1941, Serial No. 410,088

15 Claims. (Cl. 252—8.55)

This invention relates to the art of procedure commonly referred to as acidization of oil-bearing calcareous strata or the like, and which consists in introducing a strong mineral acid into an oil well for the purpose of causing the acid to disintegrate, dissolve, or react with the calcareous oil-bearing structure of the well, in a manner that results in an increase in the amount of crude petroleum obtained from the oil-bearing strata.

Many oil wells, after being subjected to acidization, produce emulsions, frequently of a very refractory nature, that have to be demulsified or subjected to chemical, electrical, or similar treatment, in order to recover the oil or valuable constituent of the emulsion. My invention has for its main object to prevent the formation of objectionable water-in-oil type emulsions resulting from acidization of oil wells; or stated in another way, one object of my invention is to provide a process or procedure by which the oil-bearing calcareous structure of a well can be acidized to increase the oil production, without danger of the procedure causing the well to produce a product, which, after being discharged from the well, has to be treated with a demulsifying agent, or subjected to other treatment of the kind commonly employed for converting refractory petroleum emulsions into oil that can be sold to pipe lines and refineries. Such refractory emulsions, which often follow conventional acidization, represent a transitory, rather than a permanent situation; but even if lasting only for a few weeks, they are extremely objectionable.

Another object of my invention is to provide a new composition of matter that is particularly adapted for use in the operation of acidizing the calcareous structure of an oil well in a way to increase the amount of crude petroleum obtainable from said structure, without however, converting said crude petroleum into an objectionable emulsion.

My new process, briefly stated, consists in causing an emulsion-preventing agent of the kind hereinafter described to be mixed with, dissolved in, or commingled with the fluids, liquids, or liquid mixture in an oil well that has been subjected to, or which is being subjected to, acidization, prior to emergence of said fluids, liquids, or liquid mixture from the well. Such emulsion-preventing agent consists of a chemical compound or condensation product obtained by polymerizing one mole of a high molal alkylolamine containing at least one hydrocarbon radical having at least eight carbon atoms, with at least one and not more than five moles of a low molal alkylolamine, in which the hydrocarbon radicals contain not more than three carbon atoms. Such polymerization is conducted at an elevated temperature, and preferably, in the presence of a polymerization catalyst to produce polymers containing at least two nitrogen atoms, and preferably, more than two nitrogen atoms. The exact composition of the polymers or condensation product obtained is unknown. For this reason many of the properties of the condensation product or products are unpredictable. It is surprising to find that such materials are stable for an extended period of time in half concentrated hydrochloric acid or other similar mineral acids. It is likewise remarkable to note that such solutions in acid, and particularly in relatively low ratios, as hereinafter described, give a very pronounced lowering of the surface tension.

As far as I am aware, the condensation products herein described are boldly new and represent a new composition of matter per se. Furthermore, such condensation products may be used as demulsifiers for oil field emulsions of the water-in-oil type in the conventional practice of breaking or resolving such emulsions. Furthermore, such condensation products may be used for breaking emulsions of a predetermined character as occur in conventional chemical de-salting procedure. Such procedure is employed to remove or eliminate inorganic salts from pipe line oil.

In practising my process, the emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground. But the particular procedure, the means used to effect the mixing or commingling of said emulsion-preventing agent with the well fluids or liquids, and the particular time when said mixing is effected, are immaterial, so long as said emulsion-preventing agent becomes mixed with, dissolved in, or commingled with the cognate fluids of the well, or the liquids, or liquid mixture resulting from the acidization operation (the oil and the reaction product of the mineral acid on the calcareous structure), prior to emergence from the well. Equally good results may be obtained by the following procedure, to wit:

(a) Introducing the emulsion-preventing agent, preferably in aqueous solution, prior to the introduction of the mineral acid into the well;

(b) Introducing the emulsion-preventing agent along with the mineral acid, i. e., dissolved in said acid; and (c) Introducing the emulsion-preventing agent, preferably in aqueous solution, immediately after the introduction of the mineral acid.

The composition of matter that I have devised for acidizing the calcareous oil-bearing structure of oil wells, consists of the emulsion-preventing agent above described, mixed with, dissolved in, or combined with a strong mineral acid, such as hydrochloric acid, nitric acid, sulfuric acid, sulfamic acid, or mixtures of the same. My preference is to use hydrochloric acid whose concentration is at least equal to approximately half strength commercial 18° Bé. acid, as I have found that when such an acid is mixed with approximately 0.01% to 2.5% of the herein contemplated emulsion-preventing agent or agents, one obtains a new composition of matter that is perfectly stable and homogeneous, and which exhibits unusual properties, particularly when said acid mixture or new composition of matter is employed in the acidization of oil-bearing strata. However, I wish it to be understood that my invention, i. e., the process and composition of matter herein described, is not restricted to the use of hydrochloric acid, but instead, contemplates the use of any suitable strong mineral acid, several of which have previously been described as being usable in place of hydrochloric acid. Similarly, I wish it to be understood that the new composition of matter herein described may have other or additional uses, such, for example, as in the acidization of oil-bearing strata which do not produce emulsions. The hydrochloric acid or the like that is employed, may or may not have present other addition agents intended to make the acid particularly adapted to most localized conditions, which sometimes arise in the course of acidization. It should be emphasized that what is said hereinafter as to the utility and effectiveness of the composition of matter herein contemplated, applies with equal force and effect to the process which forms part of the present invention.

A number of problems have been involved in the introduction of strong mineral acid into oil-bearing strata of the kind containing calcium carbonate, magnesium carbonate, mixtures of same with siliceous material, or material which is dolomitic in character, and commonly referred to as calcareous structures. One problem is the prevention of corrosion, or damage to the metallic working parts of the well into which the acid is introduced. This has been overcome in various ways, such as by the use of an inhibitor. For the sake of brevity, reference is made to the following patents which give a cross-sectional view of the art related to acidization, although there are in addition certain other practical elements which are well known: U. S. Patent No. 1,877,504, dated Sept. 13, 1932, Grebe and Sanford; 1,891,667, Dec. 20, 1932, Carr; 1,911,446, May 20, 1933, Grebe and Sanford; 1,999,969, Feb. 12, 1935, Wilson; 2,011,579, Aug. 20, 1935, Heath and Fry; 2,024,718, Dec. 17, 1935, Chamberlain; 2,038,956, Apr. 28, 1935, Parkhurst; 2,053,285, Sept. 8, 1936, Grebe; 2,128,160, Aug. 23, 1938, Morgan; 2,128,161, Aug. 23, 1938, Morgan; and 2,161,085, June 6, 1939, Phalen.

As has been previously stated, in the acidization of oil-bearing calcareous strata or the like, it has been found necessary, in some instances, to add certain other materials or compounds which give additional desirable effects, at least under certain conditions. For instance, hydrofluoric acid or fluorides, have been added to intensify the action of the hydrochloric acid used to treat the well. Possibly this is related to the action on siliceous matter in the calcareous structure. The reason for the addition or inhibitors has been previously indicated. Sometimes it has been desirable to add tenacious foam-producing agents, such as glue, gelatin, or the like. In other instances reducing agents have been added to keep any dissolved iron salts in the ferrous state. Isopropyl alcohol or the like is sometimes added as a surface tension depressant. Thus, the addition of various other auxiliary agents, commonly referred to as addition agents, is well known.

I have found that the materials or products which I contemplate adding to the hydrochloric acid or the like to produce my new composition of matter, or to act as an emulsion-preventing agent in my new process, do not interfere in any manner with the functional effect of other conventional acidizing addition agents. Of course, any single example may contain no additional agent at all; it may contain one or more, depending upon the particular local conditions and use. As far as I am aware, the herein-contemplated compounds which are added to hydrochloric acid, or any other suitable mineral acid, such as a mixture of hydrochloric acid and hydrofluoric acid, do not replace other addition agents which have been added for various other purposes. For the sake of brevity, reference will be made to hydrochloric acid as illustrating any suitable mineral acid. It is understood, of course, that such hydrochloric acid may or may not contain various amounts of hydrofluoric acid.

As previously indicated, the emulsion-preventing agents herein described have the effect of preventing emulsions, when an oil well is turned into production after the acidizing operation. Many oil wells are acidized without subsequently producing any emulsions; or the emulsions, if produced, are self-resolving, or readily susceptible to any moderate breaking action. However, certain wells, particularly those located in western Kansas and certain wells in Illinois, when acidized by conventional processes, yield particularly refractory emulsions. This is a rather surprising situation, insofar that the spent acid results in a solution having approximately 20% of calcium chloride present, and having a pH value of approximately 3.5 to 5. One would expect the increased acidity over that of most natural brines to decrease the stability of the emulsion. One would also expect that the increased electrolyte content of the dispersed phase would decrease the stability of the emulsion. The increased specific gravity differential should have a similar destabilizing effect. Actually, in a number of instances this is not the case, and such emulsions have resulted in unusual problems. In its broadest aspect, then, the agents herein contemplated may be used simply as emulsion-preventers, in connection with the acidization of subterranean strata.

The most concentrated hydrochloride acid, ordinarily available, is about 36% HCl strength.

The commercial acid of this strength, or somewhat weaker, is usually diluted with an equal quantity of water before it is used for acidization, i. e., the acid used in acidization may vary from 14% to 16.5% HCl, although acid varying in strength from 5% to 20% HCl has been employed. It is entirely feasible to add an agent to the acid as produced at the point of manufacture, thus exemplifying the composition of matter feature of the present invention. For instance, if desired, 0.02% to 5% of the contemplated agent may be added to the concentrated hydrochloric acid in manufacture. Such acid can be diluted to a suitable point before being employed in the acidization process. Thus, such concentrated acid can be diluted, for instance, half and half, so that the reagent is present in the dilute product within the ratio suggested previously, to wit: 0.01% and 2.5%. In many instances, the use of between 0.05% and 0.5% represents an acceptable average range.

In actual practice the hydrochloric acid obtained by a person or firm responsible for acidizing operations, may be used, in some instances, an oil-bearing strata which do not form severe or refractory emulsions, and thus no advantage is obtained by adding a composition of the kind herein contemplated, in comparison with ordinary acid. Then too, some calcareous oil-bearing strata which produces severe emulsions, may require more or less of the agent of the kind herein contemplated then would be necessary in some other strata. For this reason, in the practical aspect, it is generally desirable to add the agent of the kind herein contemplated to the dilute acid, so as to be suitable for the specific local conditions which require treatment. The suitable range of ratios for ordinary half-strength acid has been indicated.

As has been previously suggested, one may also add to the acid intended for acidization, various other reagents or addition products of the kind described in the aforementioned list of patents, without affecting the operation of the emulsion-preventing agent that I employ, and without danger of said emulsion-preventing agent interfering with the effectiveness of such other acidization addition products. Likewise, it has been indicated that one need not necessarily employ my emulsion-preventing agent in the form of an addition agent, which is added to or mixed with the acid used in the acidizing step. Instead, my emulsion-preventing agent may be introduced in suitable aqueous solution, preferably in fairly concentrated solution, for instance, 1-5%, prior to the acidizing step, or immediately after the acidizing step. The method of introduction is, of course, any conventional method, and preferably, employs the same apparatus and procedure used for introducing the acid. For convenience, however, and in the most preferred form, my invention is exemplified by employing as an integral part thereof the composition of matter herein contemplated, to wit, hydrochloric acid or the like, containing in stable admixture, agents of the kind subsequently to be described and within the percentage range indicated.

The ineffectiveness of most ordinary demulsifiers for preventing the formation of water-in-oil type emulsions resulting from acidization, is readily understandable. Ordinary demulsifiers either are not soluble in half-strength hydrochloric acid, or its equivalent, or they are not soluble in spent brine of the kind previously mentioned, i. e., brine containing roughly the equivalent of 20% of calcium chloride, and having a pH of 3.5 to 5. Furthermore, if soluble at all, they are generally decomposed; and if they do not decompose under ordinary conditions, they at least decompose under the conditions which involve the necessary pressure employed in acidization. Then too, in some instances where such demulsifiers appear to meet all other requirements, they apparently precipitate out on the face of the pay sand or oil-bearing strata, and may even reduce instead of increase the oil production, as compared with results obtained by ordinary acid. There are a number of other reasons not necessary to explain, which prevent ordinary demulsifiers from being effective. It is possible that the characteristic properties of the new composition of matter herein described, make it adaptable for use in other arts with which I am not acquainted; but it may be apparent to others. It is also possible that the stable mixture of the kind described, i. e., certain agents dissolved in strong mineral acid, have other properties which I have not investigated, and in view of such properties, such mixture is particularly adaptable for the particular use herein described.

The hydroxylated high molal amines employed as reactants in the manufacture of the new composition of matter of emulsion-preventing agent herein contemplated, are obtained in any suitable manner, but are most preferably obtained by reacting a high molal primary or secondary amine with an oxyalkylating agent such as ethylene oxide, propylene oxide, butylene oxide, glycid, etc. Since ethylene oxide is most readily available, and since it is more reactive, and especially on account of its lower molecular weight, I prefer to use it for introducing the hydroxylated radical. Reference is made to U. S. Patent No. 2,246,842, dated June 24, 1941, to Melvin de Groote, insofar as it includes a number of high molal amines which may be employed, or at least, will serve as reactants for combination with ethylene oxide or the like. Thus, suitable primary or secondary amines which can be reacted with ethylene oxide, butylene oxide, propylene oxide, and so forth, include: octadecenylamine; cetylamine; stearylamine; oleoamine; ricinoleoamine; amines derived from napthenic acids; amines derived from octadecadiene; 9,11,-acid-1; octadecylamine; amines derived from mixed unsaturated fatty acids; soyabean and cottonseed oil fatty acids; linseed oil fatty acids, heptadecylamine; hexadecylamine; dodecylamine; decylamine; and so forth. Similar amines can be derived from the carboxy acids obtained by the oxidation of waxes or the like.

The treatment of primary or secondary amines with ethylene oxide or the like is a well-known procedure. See, for example, U. S. Patent No. 2,233,383, dated February 25, 1941, to De Groote and Keiser, and particularly Example 2, Example 8 and Example 14. Although, as many as sixteen molar equivalents, or even more, may be combined with one mole of the amine, my preference is to use hydroxylated amines in which the ether linkage does not occur more than five times; in other words, where secondary amines have been treated with not more than six moles of ethylene oxide or the like, and primary amines with not more than 12 moles of ethylene oxide, or the like. See also U. S. Patent No. 1,970,578, dated August 21, 1934, to Scholler and Wittwerr. If a high molal amine is treated with a minimum amount of ethylene oxide or the like as a reactant, no ether linkage occurs, since only a hydroxylated hydrocarbon radical is obtained. If derived from a primary amine, only one such radical need be present along with an amino hydrogen atom.

Needless to say, the secondary amine need not have two high molar groups. Thus, instead of employing dioctylamine, dodecylamine, or the like, one may employ secondary amines, such as methyl octylamine, ethyl octylamine, propyl octylamine, methyl decylamine, ethyl decylamine, propyl decylamine, etc.

The alkylolamines which I employ for the initial preparation of the polymerized alkylolamines are varied and include ethanolamines such as monoethanolamine, diethanolamine, triethanolamine, and mixtures thereof, such as are present in commercial triethanolamine; propanol amines, butanolamines, pentanolamines, hexanolamines, glycerol amines, and mixtures thereof, as, for example:

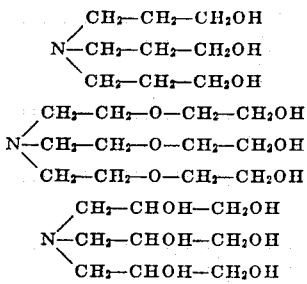

Because of the commercial availability at the present time and because of the particularly satisfactory results obtained, I prefer to utilize commercial triethanolamine which contains minor percentages of mono- and di-ethanolamine. It is, of course, obvious that the same alkylolamine need not be used in the polymerization step. Mixtures of different alkylolamines may be employed.

The method of producing polymerized alkylolamines of the kind herein contemplated is essentially a heat polymerization process, which is commonly used for the process of producing polymerized alkylolamines of various kinds. For instance, the same procedure may be employed as is described in U. S. Patent No. 2,178,173, dated October 31, 1939, to Katzman and Epstein. The polymerization of alkylolamines is effected by heating said alkylolamines at elevated temperatures, generally of the order of 200° C. to 250° C., preferably in the presence of a catalyst such as sodium hydroxide, potassium hydroxide, sodium ethylate, sodium glycerate, or other alkali catalysts. The time required for such polymerization varies with the exact temperature employed, the particular reactants selected, the nature and amount of the catalyst and also with the nature of the vessel in which the reaction takes place. For instance, certain metallic surfaces appear to hasten the reaction. In any event, there is no difficulty in controlling the reaction to the desired degree of polymerization. Various properties or characteristics serve as suitable criteria. For instance, the increase in viscosity, the loss of weight due to the evolution in water, the degree of surface activity when the condensation product is dissolved in water or dilute acid, and so forth. Even at the expense of repetition, attention will be emphasized as to the wide variety of high mole amines which may be employed as reactants. Thus, amines of this kind have already been described. These primary reactants, that is, the high mole amines capable of reaction with ethylene oxide or the like, may be produced in various manners.

They may be produced from naphthenic acids, resin acids, fatty acids, oxidized petroleum acids, or the like, by converting the acid into the ester, preferably the ethyl ester or the like, and then converting the ester into the alcohol. Such alcohols, derived from various fatty acids, naphthenic acids, oxidized petroleum acids, resin acids, and the like, are available commercially and are employed in the manufacture of wetting agents or the like by sulfating or sulfonating such alcohols. Such high molal alcohols can be converted into the chlorides, and the chlorides reacted with ammonia or a primary or secondary amine to give amines of the type herein contemplated. If derived from higher fatty acids, such as stearic acid, the hydrocarbon chain is simply an alkyl radical. Naturally, if derived from an unsaturated fatty acid, such as oleic acid, the radical would represent an unsaturated hydrocarbon radical. If derived from ricinoleic acid or some other hydroxy acid, such as hydroxystearic acid, one would have a hydroxylated hydrocarbon radical.

In actual practice amines of the kind herein contemplated can be obtained in various ways. Reference is made to a number of patents which disclose or describe such amines, or the method of manufacturing the same. In some cases obvious modifications will be required to produce amines of the kind contemplated; but such modifications would be evident to a skilled chemist, without further discussion. See the following patents: U. S. Patent No. 1,951,469, Bertsch, Mar. 20, 1934; 2,006,058, Olin, June 25, 1935; 2,033,-866, Schrauth, Mar. 10, 1936; 2,074,380, Flett, Mar. 23, 1937; 2,075,825, Nafash, Apr. 6, 1937; 2,078,922, Arnold, May 4, 1937; 2,091,105, Pigott, Aug. 24, 1937; 2,108,147, Speer, Feb. 15, 1938; 2,110,199, Carothers, Mar. 8, 1938; 2,132,902, Lenher, Oct. 11, 1938; and 2,178,522, Ralston, Oct. 31, 1938. British Patent No. 359,001 to Johnson, on behalf of I. G. Farbenindustrie, A.-G., 1932; and British Patent No. 358,114, to Carpmael, on behalf of I. G. Farbenindustrie, A.-G., 1932. See also Industrial & Engineering Chemistry, industrial edition, volume 32, No. 4 (1940), p. 486.

In view of what has been said, it will be noted that the group introduced into the amine and derived at least hypothetically from an acid is really the carbon chain radical of the acyl group of the acid or hypothetical acid, along with what was at least hypothetically the carbonyl carbon atom. For the sake of convenience, this radical will be referred to as a hydrocarbon radical; and it is intended to include derivatives in which a hydrogen atom or a small number of hydrogen atoms have been replaced by the hydroxyl radical; for instance, the hydroxy hydrocarbon radical which would be supplied by ricinoleic acid, hydroxystearic acid, dihydroxystearic acid, or the like. In the present instance such usage seems eminently correct, in that the hydrocarbon radical supplies the hydrophobe portion of the amine, and this hydrophobe portion is not changed markedly by the presence of one or two hydroxyl groups, as are present in the case of ricinoleic acid, hydroxystearic acid, or the like; and such hydroxyl groups are essentially non-functional, in that they are not relied upon to supply points of chemical activity. They may slightly decrease the hydrophobe character of the radical to some degree; but this cannot be significant, as can be appreciated by reference to ricinoleic acid. Since the carbon atom chain supplied to the amine by means of ricinoleic acid has 18 carbon atoms, it would appear relatively immaterial whether there was present one hydroxyl group or not. Thus, it is to be borne in mind that the use in the hereto appended claims of the word "hydrocarbon" is intended to include the hydroxy-hydrocarbon type of the kind in which the hydroxyl group does not materially reduce the hydrophobe character of the hydrocarbon group, as, for example, the group or radical which would be obtained from recinoleic acid. Attention is particularly directed to the fact that the means disclosed include those in which the hydrocarbon group may be aralkyl or alicyclic, as well as aliphatic.

It does not appear necessary to elaborate further as to the method of manufacture, but for purposes of clarity, the following examples are included:

Hydroxylated High Molal Amine
Example 1

One pound mole of octadecenylamine is reacted with two pound moles of ethylene oxide to give the dihydroxylated derivative.

Hydroxylated High Molal Amine
Example 2

The same procedure is followed as in Example 1, preceding, except that four pound moles of ethylene oxide are employed instead of two pound moles.

Hydroxylated High Molal Amine
Example 3

The same procedure is employed as in Example 1, except that six pound moles of ethylene oxide are employed instead of two pound moles.

Hydroxylated High Molal Amine
Example 4

The same procedure is employed as in Example 1, except that ten pound moles of ethylene oxide are employed, instead of two pound moles.

Hydroxylated High Molal Amine
Example 5

Cetylamine is substituted for octadecylamine in Examples 1 to 4, preceding.

Hydroxylated High Molal Amine
Example 6

Oleoamine is substituted for octadecylamine in Examples 1 to 4, preceding.

Hydroxylated High Molal Amine
Example 7

Ricinoleoamine is substituted for octadecylamine in Examples 1 to 4, preceding.

Hydroxylated High Molal Amine
Example 8

Amines derived from naturally-occurring naphthenic acids are substituted for octadecylamine in Examples 1 to 4, preceding.

Hydroxylated High Molal Amine
Example 9

Amines derived from oxidized wax acids and having approximately 22 to 26 carbon atoms in the acyl radical of the acids prior to conversion into amines, are substituted for octadecylamine in Examples 1 to 4, preceding. As to such wax acids see U. S. Patent No. 2,242,837, dated May 20, 1941, to Shields.

Hydroxylated High Molal Amine
Example 10

Amines derived from mixed unsaturated fatty acids, such as soyabean fatty acids, cottonseed oil fatty acids, or linseed oil fatty acids, are substituted for octadecylamine in Examples 1 to 4, preceding.

Hydroxylated High Molal Amine
Example 11

Amines derived from abietic acid are substituted for octadecylamine in Examples 1 to 4, preceding.

At this point attention is also directed to co-pending application for Patent Serial No. 273,278, filed May 12, 1939, by Melvin De Groote and Bernhard Keiser. Briefly stated, said co-pending application teaches, among other things, the formation of certain hydroxylated amines by means of an alcoholate derived, for example, from triethanolamine and a chlorhydrin, such as glycerine chlorhydrin, and the like. Examples of hydroxylated amines obtained by the procedure described in said aforementioned De Groote and Keiser application may be illustrated by the following examples:

$$N \begin{cases} C_2H_4OC_3H_5 \begin{cases} OH \\ OH \end{cases} \\ C_2H_4OH \\ C_2H_4OH \end{cases}$$

$$N \begin{cases} C_2H_4OC_2H_4OH \\ C_2H_4OH \\ C_2H_4OH \end{cases}$$

$$N \begin{cases} C_2H_4O \\ C_2H_4O \end{cases} C_3H_5OH \\ C_2H_4OH \end{cases}$$

$$N \begin{cases} C_2H_4OC_3H_5 \begin{cases} OH \\ OH \end{cases} \\ C_2H_4OC_3H_5 \begin{cases} OH \\ OH \end{cases} \\ C_2H_4OH \end{cases}$$

$$N \begin{cases} C_2H_4OC_3H_5 \begin{cases} OH \\ OH \end{cases} \\ C_2H_4OC_3H_5 \begin{cases} OH \\ OH \end{cases} \\ C_2H_4OC_3H_5 \begin{cases} OH \\ OH \end{cases} \end{cases}$$

Such hydroxylated amines are just as suitable as triethanolamine or the like for the manufacture of the condensation products or polymerization products herein contemplated.

POLYMERIZATION PRODUCT
Example 1

One pound mole of triethanolamine is mixed with one pound mole of an hydroxylated high molal amine of the kind described in "Hydroxylated high molal amines," Examples 1 to 11, preceding. Approximately one-half of 1% of caustic soda is added to the mixture to serve as a catalyst. The product is heated for approximately three hours at 245 to 260° C.; the mass is stirred constantly and any distillate is condensed and reserved for re-use after an intermediate rectification step. At the end of approximately two and a half to three and a half hours condensation is complete. Actually, a suitable condensation product may be obtained in much less time, depending upon the particular high mole amine employed, and also on the nature of the reacting vessel. A person skilled in the art, of course, will appreciate that as soon as condensation starts actively, samples should be taken and tested in any suitable manner, such as viscosity, surface-active property, molecular weight determination, demulsification test on a selected emulsion, etc. Progress of polymerization can also be determined, in part, by the water content of the collected distillate. If active condensation takes place at a temperature below the 245 to 260° C., then, of course, such lower temperature may be feasibly employed. If, on the other hand, condensation does not take place at 245° to 260° C., then a somewhat higher temperature may be employed. It is also to be noted that the rate of polymerization may be influenced by increasing or decreasing the amount of catalyst in any particular instance. In other words, in some instances, a quarter of a percent of caustic soda may be sufficient, whereas, in other instances, three-quarters of a percent of caustic soda may be employed.

POLYMERIZATION PRODUCT
Example 2

The same procedure is employed as in the previous example, except that heating is continued for approximately another hour. In this instance the reaction mass will show a distinctly higher molecular weight.

POLYMERIZATION PRODUCT
Example 3

The same procedure is followed as in Example 2, except that a slightly higher temperature, approximately ten degrees higher, is employed, and a somewhat longer reaction time; for instance, one half to one and one-half hours longer.

POLYMERIZATION PRODUCT
Example 4

Tri-isopropanolamine is substituted for triethanolamine in Examples 1, 2 and 3.

POLYMERIZATION PRODUCT
Example 5

Diethanolamine is substituted for triethanolamine in Examples 1, 2 and 3.

POLYMERIZATION PRODUCT
Example 6

Polyethanolamine of the following formula:

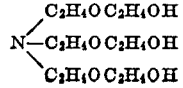

is substituted for triethanolamine in the previous examples.

POLYMERIZATION PRODUCT
Example 7

Mixtures of the various amines previously described are made with glycerol in the proportion of two parts of hydroxy amine and one part of glycerol. One percent of caustic soda is added to the mixture and the same procedure employed as indicated in Examples 1, 2 and 3, although there may be some variation necessary to obtain the proper molecular weight range and surface activity. In any event, molecular weight determinations can be employed, as well as a foam test of the kind previously described.

POLYMERIZATION PRODUCT
Example 8

Diglycerylamine is substituted for triethanolamine, in Examples 1, 2 and 3, previously described.

POLYMERIZATION PRODUCT
Example 9

The same procedure is followed as in Polymerization product, Examples 1 to 8, preceding, except that two pound moles of the low molal amines, for instance, triethanolamine, are used instead of one pound moles. Naturally, such condensation product involves the elimination of more water, and thus all condensation steps may have to be conducted for a somewhat longer period of time.

POLYMERIZATION PRODUCT
Example 10

The same procedure is followed as in Polymerization product, Example 9, preceding, except that three pound moles of the low molal alkylolamine are employed instead of two pound moles.

POLYMERIZATION PRODUCT
Example 11

The same procedure is followed as in Polymerization product, Example 10, preceding, except that five pound moles of the low molal alkylolamine are employed instead of three pound moles.

It is obvious that polymerized condensation products of the kind described, having at least two basic amino amine radicals combined with water so as to form the base, and thus in many instances, the actual effectiveness of the polymerization product as a demulsifier, may be due to the base, that is, the combination with water, rather than the free amine. The base may, of course, be considered as being the salt of water, if one looks upon water as being an acid. Similarly, one is not limited to amines of the kind where the base shows demulsifying effectiveness, but one may employ such amines, i. e., such condensation of polymerization products in the form of a selected salt, such as the acetate, lactate, chloride, nitrate, citrate, sulfate, etc. For the sake of brevity, reference will be made to the amine or polymerization product but it is understood that it is immaterial if the condensation product is used as such, or whether it is used as contact with water, such as a base form, or whether it is used in some other convenient salt form, such as the compound formed by reaction with acetic acid, lactic acid, hydrochloric acid, or the like. This is particularly true if mixed with hydrochloric acid, because the chloride would be formed. However, when used particularly for the primary purpose of preventing water-in-oil types of emulsions resulting from acidization of calcareous oil-bearing strata, it is most desirable to dissolve the polymerization product as is, as differentiated from a salt form in the selected mineral acid or hydrochloric acid.

It is to be noted that in the preceding examples the polymerization products are derived from reactants obtained, in turn, by oxyethylation of a primary amine. Needless to say, instead of using ethylene oxide, propylene oxide or butylene oxide, could have been employed. Furthermore, secondary amines, such as dioctylamine, could have been employed for reaction with ethylene oxide, or the like. My preference, however, is as follows: To employ as reactants high molal amines derived by oxyethylation of aliphatic amines having a hydrocarbon radical containing at least 8 and not more than 18 carbon atoms, and particularly those derived from unsaturated fatty acids. I prefer to treat such primary amines with at least two moles and not more than six moles of ethylene oxide. I prefer to treat such hydroxylated high molal amines of the preferred type with at least two and not more than five moles of triethanolamine. I prefer to use triethanolamine, rather than any of the other amines enumerated, and, although excellent compounds are obtained by partially or completely replacing triethanolamine with diethanolamine, or, at least, using some monoethyl, I have found that the most desirable products are obtained by the use of triethanolamine, in preference to any other lower molal amines.

I again desire to point out that the condensation products of the kind described, as far as I know, are a new composition of matter per se, but in the hereto appended claims the expression "new composition of matter" is directed to the combination of such condensation products with a mineral acid such as hydrochloric acid.

All the chemical compounds previously described are water-soluble as such, or when dissolved in dilute acid, or acid of the concentration indicated. Such compounds may be combined not only with mineral acids, but also with organic acids, such as acetic acid, lactic, stearic acid, or the like. For this reason they can be used without difficulty in aqueous solution as an emulsion-prevention agent by injecting such aqueous solution into the oil-bearing strata prior to acidization, or immediately after acidization. Such injection is made by conventional means, as, for example, the same apparatus or mechanical device employed for injecting acid into the well or oil-bearing strata. Furthermore, substantially all the compounds above described are soluble in hydrochloric acid of a strength corresponding to approximately 15%. Furthermore, substantially all the compounds of the type indicated are soluble in concentrated hydrochloric acid. Commercial hydrochloric acid is ordinarily available in grades from approximately 18° Bé., corresponding to approximately 28% anhydrous acid, to 22° Bé., corresponding to approximately 35.2% anhydrous acid. Some commercial hydrochloric acid is available in a strength which approximates the C. P. grade, or slightly less than 37% anhydrous acid.

The selected compound may be dissolved in concentrated hydrochloric acid without dilution. The percentages employed have already been indicated. Such a concentrated hydrochloric acid may or may not contain some hydrofluoric acid. Likewise, if desired, the emulsion-preventing agent may be dissolved in water, and such aqueous solution added to the hydrochloric acid or the like, in order to dilute the same to the desired concentration. Another procedure, of course, is to add the particular chemical compound which has been selected as the emulsion-preventing agent. The percentages of chemical compound of the kind herein described is added within the range of 0.01% to 5%.

Having thus described my invention, what I claim as new and desire to secure by Letters Patent is:

1. A process for preventing water-in-oil emulsions resulting from the acidization of calcareous oil-bearing strata, which consists in introducing into the cognate fluids of a well prior to emergence, the condensation product derived by polymerizing one mole of a basic high molal alkylolamine having at least one hydrocarbon radical having at least 8 and not more than 26 carbon atoms and said hydrocarbon radicals being selected from the class consisting of aralkyl, alicyclic and alkyl radicals, with at least one mole and not more than five moles of a low molal basic alkylolamine of the kind in which the hydrocarbon radical does not contain more than three carbon atoms; said polymerization being conducted at elevated temperatures to produce polymers containing at least two nitrogen atoms, said high molal alkylolamines being characterized by the fact that to the extent that hydroxylated radicals contain ether linkages such ether linkages shall not exceed 5.

2. A process for preventing water-in-oil emulsions resulting from acidization of calcareous oil-bearing strata, which consists in introducing into the cognate fluids of a well prior to emergence, the condensation product derived by polymerizing one mole of a basic high molal alkylolamine having at least one aliphatic hydrocarbon radical having at least 8 and not more than 26 carbon atoms, with at least one mole and not more than five moles of a low molal basic alkylolamine of the kind in which the hydrocarbon radical does not contain more than three carbon atoms; said polymerization being conducted at elevated temperatures to produce polymers containing at least two nitrogen atoms, said high molal alkylolamines being characterized by the fact that to the extent that hydroxylated radicals contain ether linkages such ether linkages shall not exceed five.

3. A process for preventing water-in-oil emulsions resulting from acidization of calcareous oil-bearing strata, which consists in introducing into the cognate fluids of a well prior to emergence, the condensation product derived by polymerizing one mole of a basic high molal alkylolamine having at least one aliphatic hydrocarbon radical having at least 8 and not more than 18 carbon atoms, with at least one mole and not more than 5 moles of a low molal basic alkylolamine of the kind in which the hydrocarbon radical does not contain more than three carbon atoms; said polymerization being conducted at elevated temperatures to produce polymers containing at least two nitrogen atoms, said high molal alkylolamines being characterized by the fact that to the extent that hydroxylated radicals contain ether linkages such ether linkages shall not exceed five.

4. A process for preventing water-in-oil emulsions resulting from acidization of calcareous oil-bearing strata, which consists in introducing into the cognate fluids of a well prior to emergence, the condensation product derived by polymerizing one mole of a basic high molal alkylolamine having at least one aliphatic hydrocarbon radical having at least 8 and not more than 18 carbon atoms, with at least one mole and not more than 5 moles of a low molal basic alkylolamine of the kind in which the hydrocarbon radical does not contain more than three carbon atoms; said polymerization being conducted at elevated temperatures to produce polymers containing at least two nitrogen atoms, said high molal alkylolamines being characterized by the fact that to the extent that hydroxylated radicals contain ether linkages such ether linkages shall not exceed five.

5. A process for preventing water-in-oil emulsions resulting from acidization of calcareous oil-bearing strata, which consists in introducing into the cognate fluids of a well prior to emergence, the condensation product derived by polymerizing one mole of a basic high molal alkylolamine having at least one aliphatic hydrocarbon radical having at least 8 and not more than 18 carbon atoms, with at least one mole and not more than five moles of a low molal basic ethanolamine; said polymerization being conducted at elevated temperatures to produce polymers containing at least two nitrogen atoms, said high molal alkylolamines being characterized by the fact that to the extent that hydroxylated radicals contain ether linkages such linkages shall not exceed five.

6. A process for preventing water-in-oil emulsions resulting from acidization of calcareous oil-bearing strata, which consists in introducing into the cognate fluids of a well prior to emergence, the condensation product derived by polymerizing one mole of a basic high molal alkylolamine having at least one aliphatic hydrocarbon radical having at least 8 and not more than 18 carbon atoms, with at least one mole and not more than five moles of a low molal tertiary ethanolamine; said polymerization being conducted at elevated temperatures to produce polymers containing at least two nitrogen atoms, said high molal alkylolamines being characterized by the fact that to the extent that hydroxylated radicals contain ether linkages such ether linkages shall not exceed five.

7. A process for preventing water-in-oil emulsions resulting from acidization of calcareous oil-bearing strata, which consists in introducing into the cognate fluids of a well prior to emergence, the condensation product derived by polymerizing one mole of a basic high molal alkylolamine having at least one aliphatic hydrocarbon radical having at least 8 and not more than 18 carbon atoms, with at least one mole and not more than five moles of triethanolamine; said polymerization being conducted at elevated temperatures to produce polymers containing at least two nitrogen atoms, said high molal alkylolamines being characterized by the fact that to the extent that hydroxylated radicals contain ether linkages such ether linkages shall not exceed five.

8. A new composition of matter, comprising a strong mineral acid and the condensation product derived by polymerizing one mole of a basic high molal alkylolamine having at least one hydrocarbon radical having at least 8 and not more than 26 carbon atoms and said hydrocarbon radicals being selected from the class consisting of aralkyl, alicyclic and alkyl radicals, with at least one mole and not more than five moles of a low molal basic alkylolamine of the kind in which the hydrocarbon radical does not contain more than three carbon atoms; said polymerization being conducted at elevated temperatures to produce polymers containing at least two nitrogen atoms, said high molal alkylolamines being characterized by the fact that to the extent that hydroxylated radicals contain ether linkages such ether linkages shall not exceed five; said acid in uncombined form being present on a large molal excess basis in comparison with the condensation product.

9. A new composition of matter, comprising hydrochloric acid and the condensation product derived by polymerizing one mole of a basic high molal alkylolamine having at least one hydrocarbon radical having at least 8 and not more than 26 carbon atoms and said hydrocarbon radicals being selected from the class consisting of aralkyl, alicyclic and alkyl radicals, with at least one mole and not more than five moles of a low molal basic alkylolamine of the kind in which the hydrocarbon radical does not contain more than three carbon atoms; said polymerization being conducted at elevated temperatures to produce polymers containing at least two nitrogen atoms, said high molal alkylolamines being characterized by the fact that to the extent that hydroxylated radicals contain ether linkages such ether linkages shall not exceed 5; said acid in uncombined form being present on a large molal excess basis in comparison with the condensation product.

10. A new composition of matter, comprising hydrochloric acid and the condensation product derived by polymerizing one mole of a basic high molal alkylolamine having at least one aliphatic hydrocarbon radical having at least 8 and not more than 26 carbon atoms, with at least one mole and not more than five moles of a low molal basic alkylolamine of the kind in which the hydrocarbon radical does not contain more than three carbon atoms; said polymerization being conducted at elevated temperatures to produce polymers containing at least two nitrogen atoms, said high molal alkylolamine being characterized by the fact that to the extent that hydroxylated radicals contain ether linkages such ether linkages shall not exceed five; said acid in uncombined form being present on a large molal excess basis in comparison with the condensation product.

11. A new composition of matter, comprising a strong mineral acid and the condensation product derived by polymerizing one mole of a basic high molal alkylolamine having at least one aliphatic hydrocarbon radical having at least 8 and not more than 18 carbon atoms, with at least one mole and not more than five moles of a low molal basic alkylolamine of the kind in which the hydrocarbon radical does not contain more than three carbon atoms; said polymerization being conducted at elevated temperatures to produce polymers containing at least two nitrogen atoms, said high molal alkylolamines being characterized by the fact that to the extent that hydroxlated radicals contain ether linkages such ether linkages shall not exceed five; said acid in uncombined form being present on a large molal excess basis in comparison with the condensation product.

12. A new composition of matter, comprising a strong mineral acid and the condensation product derived by polymerizing one mole of a basic high molal alkylolamine having at least one aliphatic hydrocarbon radical having at least 8 and not more than 18 carbon atoms, with at least one mole and not more than 5 moles of a low molal basic alkylolamine of the kind in which the hydrocarbon radical does not contain more than three carbon atoms; said polymerization being conducted at elevated temperatures to produce polymers containing at least two nitrogen atoms, said high molal alkylolamines being characterized by the fact that to the extent that hydroxylated radicals contain ether linkages such ether linkages shall not exceed five; said acid in uncombined form being present on a large molal excess basis in comparison with the condensation product.

13. A new composition of matter, comprising hydrochloric acid and the condensation product derived by polymerizing one mole of a basic high molal alkylolamine having at least one aliphatic hydrocarbon radical having at least 8 and not more than 18 carbon atoms, with at least one mole and not more than five moles of a low molal basic ethanolamine; said polymerization being conducted at elevated temperatures to produce polymers containing at least two nitrogen atoms, said high molal alkylolamines being characterized by the fact that to the extent that hydroxylated radicals contain ether linkages such ether linkages shall not exceed five; said acid in uncombined form being present on a large molal excess basis in comparison with the condensation product.

14. A new composition of matter, comprising hydrochloric acid and the condensation product derived by polymerizing one mole of a basic high molal alkylolamine having at least one aliphatic hydrocarbon radical having at least 8 and not more than 18 carbon atoms, with at least one mole and not more than 5 moles of a low molal tertiary ethanolamine; said polymerization being conducted at elevated temperatures to produce polymers containing at least two nitrogen atoms, said high molal alkylolamines being characterized by the fact that to the extent that hydroxylated radicals contain ether linkages such ether linkages shall no exceed five; said acid in uncombined form being present on a large molal excess basis in comparison with the condensation product.

15. A new composition of matter, comprising hydrochloric acid and the condensation product derived by polymerizing one mole of a basic high molal alkylolamine having at least one aliphatic hydrocarbon radical having at least 8 and not more than 18 carbon atoms, with at least one mole and not more than five moles of triethanolamine; said polymerization being conducted at elevated temperatures to produce polymers containing at least two nitrogen atoms, said high molal alkylolamines being characterized by the fact that to the extent that hydroxylated radicals contain ether linkages such ether linkages shall not exceed five; said acid in uncombined form being present on a large molal excess basis in comparison with the condensation product.

MELVIN DE GROOTE.